Patented Feb. 2, 1954

UNITED STATES PATENT OFFICE 2,668,152

METHOD OF PRODUCING CELLULAR MATERIALS AND COMPOSITIONS THEREFOR

Grady M. O'Neal, Chicago, Ill., assignor to The Sherwin-Williams Company, Cleveland, Ohio, a corporation of Ohio No Drawing. Continuation of application Serial No. 71,552, January 18, 1949. This application March 27, 1951, Serial No. 217,887

15 Claims. (Cl. 260—2.5)

This invention relates to the manufacture of cellular products from materials which may be expanded and set in an expanded state. More particularly, this invention relates to a new and improved process for the manufacture of cellular natural or synthetic rubber products, known in the industry as "sponge rubber."

This application is a continuation of my copending application Serial No. 71,552, filed January 18, 1949, which in turn is a continuation in part of my copending application Serial No. 586,621, filed April 4, 1945.

Cellular rubber products are usually produced by incorporating into the soft unvulcanized rubber mix a heat decomposable chemical or chemicals, and heating the resultant mix to such a temperature that the heat decomposable chemical or chemicals are decomposed to form bubbles of gas or vapor distributed within the rubber mixture. The chemicals used for this purpose are usually referred to as blowing agents or gas producing agents. The bubbles of gas cause the rubber mixture to expand, and while in the expanded state the rubber mixture is vulcanized, usually with the aid of the heat which is used to decompose the blowing agent. The result is a cellular or porous type product, usually referred to in the rubber industry as "sponge rubber."

Among the chemicals chiefly used for this purpose are sodium bicarbonate, ammonium bicarbonate and diazo-amino-benzene. Sodium bicarbonate is used either alone, or, more commonly, with certain fatty acids which promote the decomposition of the sodium bicarbonate (i. e., enable decomposition to take place at a lower temperature or with less sodium bicarbonate being used). The principal products of the decomposition of sodium bicarbonate are carbon dioxide, water, and the sodium salts of the natural rubber acids or of any added fatty acids. The chief virtue of sodium bicarbonate is its cheapness. The disadvantages are that it is difficult to disperse through the rubber mix, it gives a coarse uneven blow, it imparts to the rubber product a harsh "feel," it adversely affects the cure produced by many accelerators used in vulcanization, and it is usually necessary to use fairly large quantities of fatty acids in order to obtain sufficient blowing effect to produce satisfactory expansion of the mix. In the latter case there are left in the rubber product relatively large amounts of water soluble sodium soaps of the fatty acids used. These are leached out if the rubber product is immersed in water.

Ammonium bicarbonate is used alone. It produces carbon dioxide, water, and ammonia when heated. The disadvantages are: it is unstable in storage and may be partially decomposed before being used, it is unstable when incorporated into the rubber mix and therefore the unvulcanized mix may be partially blown during storage prior to the time it is desired to vulcanize the rubber, and it is usually irregular in crystal structure, thus producing cells of widely different sizes after vulcanization and a rubber product of non-uniform texture.

A further disadvantage of both sodium bicarbonate and ammonium bicarbonate is that it is usually necessary to compress the sponge product by putting it through wringing rolls immediately after it is removed from the mold or vulcanizer. This is done because water vapor is produced when either sodium bicarbonate or ammonium bicarbonate is used as a blowing agent, and it is necessary to break the walls of the cells by compression and replace the water vapor in the cells with air. If the water vapor is allowed to remain in the cells, it will condense to water when the product is cooled to room temperature and the cells will collapse, thus eliminating to a substantial extent the cellular structure. The process of compressing or wringing the sponge product is costly because of the labor and equipment necessary.

Diazo-amino-benzene is used alone, although it may be used in conjunction with sodium bicarbonate in order to minimize the disadvantages of each. The products of decomposition are nitrogen and certain organic chemicals. The disadvantages are: it is much more expensive than other blowing agents, it belongs to the group of chemicals, called azo-like dyes, which are used as dyes or coloring agents and for that reason it imparts an objectionable color to everything with which it comes in contact, so much so that it is difficult to make a cellular product in a desired color; and it is of relatively low solubility in rubber and synthetic rubber and will therefore come to the surface (termed "bloom to the surface") and stay as a surface coating on the unvulcanized or vulcanized rubber product, thereby staining or coloring any material or fabric which comes in contact with the rubber product.

An object of the present invention is to provide a new and improved method for producing cellular materials.

A further object is to provide a method of producing cellular materials in which the blowing agent is relatively inexpensive, is easy to incorporate into a solid rubber mix on the rubber mill, and has the ability to generate relatively large quantities of gas per unit weight of the chemical used.

Still a further object of the invention is to provide a new and improved type of blowing agent for making cellular products which is characterized by stability against substantial gas generation under ordinary storage conditions, the ability to generate gas at elevated temperatures, and the ability to generate gas in medium sized cells or pockets that are neither too large nor too small.

Another object of the invention is to provide a method of generating a gas in rubber which does not easily diffuse through the rubber and which remains in the gaseous state when the rubber is cooled down to room temperature.

Still other objects of the invention are the provision of blowing methods for blowing rubber which are not harmful to the rubber product, nor to workers in the rubber factory, nor to fabrics which come in contact with the finished product, nor to users of the product. Other objects will appear hereinafter.

In accordance with this invention it has been found that new and improved results in the manufacture of cellular products are obtained by blowing the products with biuret. The biuret is preferably conditioned for use by grinding it in any suitable manner to a fineness which will produce the desired cell size when used.

The biuret is then incorporated or added to the soft unvulcanized rubber mix in such a manner that the temperature of the mix is at all times lower than the temperature at which substantial decomposition of the biuret occurs. For example, one means of producing cellular products is as follows: Incorporate the biuret into the rubber mix on a rubber mill at temperatures preferably between 70 degrees F. and 212 degrees F. Pass the rubber mix containing the blowing agent through a rubber mill or calender to form a sheet of rubber of the desired thickness. Place the rubber sheet into a mold, which is normally substantially larger than the piece which is inserted in the mold so that expansion and cell formation can occur. Apply heat to the rubber mix, for example, by applying heat to the platens of a hydraulic press, which may be heated to temperatures say of 287 degrees F. to 320 degrees F. The biuret decomposes and gases are formed in the rubber mass in small pockets. At the same time, since the rubber contains ingredients capable of vulcanizing it at the temperatures used, it will assume a permanent shape conforming to that of the mold.

On the application of heat anhydrous biuret produces ammonia according to the following equation:

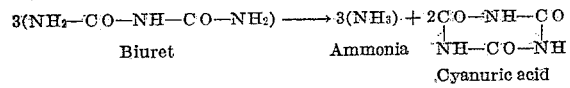

$$3(NH_2-CO-NH-CO-NH_2) \longrightarrow 3(NH_3) + 2CO-NH-CO$$

Biuret      Ammonia    NH-CO-NH

Cyanuric acid

On the application of heat to biuret containing water of hydration, the decomposition occurs as is indicated in the above equation, and in addition there is produced a small quantity of water vapor which is the product of the water of hydration.

The temperatures used should be such that the ammonia is given off in sufficient quantity to develop an internal pressure greatly in excess of the external pressure. It will be understood that the biuret decomposes and liberates very substantial quantities of ammonia at temperatures well below the point at which complete decomposition occurs. The result is expansion of the rubber compound to produce a multitude of cells which are in effect small pockets of ammonia enclosed in the rubber.

The cyanuric acid which is also produced is in no way harmful to the rubber compound. It does not affect the cure. It is insoluble in water and ordinary solvents; therefore, it will not be affected by water or solvent in which the finished product may be immersed. Cyanuric acid is stable to temperatures above 360 degrees C. (680 degrees F.).

The invention will be further illustrated but is not limited by the following examples in which the quantities are stated in parts by weight:

*Example I*

This example illustrates the compounding of GR-S sponge rubber in accordance with the practice of the invention. The term GR-S refers to a butadiene-styrene polymer of the Buna-S type manufactured by the Rubber Reserve Corporation.

The formulas A, B, and C given in this example cover cellular products made by compounding the ingredients in the proportions described and then press curing on a press having heated platens.

The synthetic rubber polymer (GR-S) should be well broken down, although not to the extent that is necessary when using sodium bicarbonate as the blowing agent. Proper plasticity may be obtained by a suitable milling period or by the addition of a suitable plasticizer.

The reinforcing fillers such as the various carbon blacks, which are necessary to give even moderate tensile strength to this type of rubber, can be used without producing too stiff an uncured stock, provided sufficient quantities of softeners are present.

The quantity of biuret used may vary, depending upon the plastic polymer employed, however, in the case of GR-S synthetic rubber, the range of 4 to 15 parts of biuret per 100 parts of rubber is preferred.

By manipulations well known to those skilled in the art, the following formulations may be compounded and then processed to produce sponge or cellular products. It will be understood that these examples are illustrative and do not limit the practice of the invention.

| | A | B | C |
|---|---|---|---|
| GR-S | 100 | 100 | 100 |
| SRF Furnace Black (Semi-reinforcing furnace type carbon black) | 20 | | 60 |
| HMF Furnace Black (High modulus furnace type carbon black) | 10 | 10 | |
| Whiting | | | 20 |
| Tetramethyl thiuram monosulfide | | 0.2 | |
| Benzothiazyl disulfide | 1 | 1 | |
| Zinc diethyl dithiocarbamate | 0.1 | | |
| Mercaptobenzothiazole | | | 1 |
| Litharge | | | 1.5 |
| Zinc Oxide | .5 | .5 | .5 |
| Stearic Acid | 5 | 5 | 2 |
| Circo Oil (A petroleum type oil-softener) | 32 | 40 | 60 |
| R. P. A. #5 (Zinc salt of the mercaptan of a hydrocarbon in a neutral solvent) | 5 | 3 | |
| Sulfur | 2.5 | 2.5 | 2 |
| Biuret | 6.7 | 6.7 | 10 |
| Physical Properties: | | | |
| Press Cure at 324 degrees F. (min.) | 15 | 15 | 13 |
| Press Cure at 298 degrees F. (min.) | 20 | 20 | 15 |
| Percent Blow | 205 | 220 | 200 |
| Apparent Density (oz./cu. in.) | .22 | .20 | .24 |

*Example II*

The following batches, in which the quantities are stated in parts by weight, were mixed on a rubber mill and were sheeted off in thin sheets:

| | A | B | C |
|---|---|---|---|
| GR-S | 100 | 100 | 100 |
| SRF Furnace Black (Semi-reinforcing furnace type carbon black) | 25 | 25 | 25 |
| HMF Furnace Black (High modulus furnace type carbon black) | 10 | 10 | 10 |
| Zinc Oxide | 5 | 5 | 5 |
| Stearic Acid | 3 | 3 | 3 |
| Light process oil (Circo oil) | 38 | 38 | 38 |
| Benzothiazyl disulfide | | 1.2 | 1.2 |
| Zinc diethyl dithiocarbamate | | 0.2 | 0.2 |
| Sulfur | 2.5 | 2.5 | 2.5 |
| Biuret | 2.0 | 2.0 | 5.0 |

Slabs of the above batches were cut and placed in a steel mold and cured in a hydraulic press, heat being applied through steam platens. The amount of uncured stock placed in the mold determined the apparent density of the finished cellular product.

The conditions of the experiment and the results which were obtained were as follows.

The following factors were considered in judgment of the results obtained.

| Trial | Time temperature | Wt./unit Volume | A | B | C |
|---|---|---|---|---|---|
| I | 15 min. at 324° F | .20 oz./cu. in. | Did not cure; Soft and sticky. | Cured; Unsatisfactory blow; Only a few cells formed, which caved in after taking from mold. | Cured; Good blow; Many cells; Sponge was not entirely filled out at edges; Did not collapse. |
| II | ___do___ | .24 oz./cu. in. | Did not cure; Same as Trial #1. | Cured; Same as Trial #1. | Cured; Good blow; Many cells; Sponge was filled out over whole area; Did not collapse when taken from mold. |

These results indicate that in Example A, Trials I and II, that biuret in 2% concentrations alone produces neither a satisfactory cure nor a satisfactory sponge. Example B, Trials I and II, illustrates that a satisfactory cure was obtained when sufficient accelerator of vulcanization was present, but also shows that 2% of biuret was insufficient to produce a satisfactory cellular product. Example C, Trials I and II, demonstrates that at a concentration of biuret, appreciably higher than 2%, a satisfactory cellular product does form in both instances, and that such compositions as shown in Example C are free from cavitation of the cells upon removal from the mold and are sufficiently vulcanized by presence of known accelerators of vulcanization to produce useful products.

Example III

The following batch was mixed on a rubber mill and sheeted off into thin sheets.

| | |
|---|---|
| GR–S | 100 |
| SRF Furnace Black (semi-reinforcing furnace type carbon black) | 25 |
| HMF Furnace Black (high modulus furnace type carbon black) | 10 |
| Zinc oxide | 5 |
| Stearic acid | 3 |
| Light process oil (Circo oil) | 38 |
| Benzo thiazyl disulfide | 1.2 |
| Zinc diethyl dithiocarbamate | 0.2 |
| Sulfur | 2.5 |
| Biuret | 4.0 |

Slabs of the above batch were cut and placed in a steel mold and cured in a hydraulic press, heat being applied through steam platens. The amount of uncured stock placed in the mold determined the apparent density of the cellular product. The product when cured for 15 minutes at 324 degrees F. had a weight per unit volume of .24 ounce per cubic inch. This product is useful in certain commercial applications such as in drum gaskets where the demand is not very exacting, but on the whole the results were less desirable than those obtained with a minimum of 5% of biuret. The present example represents the approximate minimum of the quantity of biuret alone which can be used for the purpose of the invention.

Example IV

The following example illustrates the application of the invention to the preparation of cellular products where the biuret is employed in conjunction with other blowing agents. The following batches were mixed on a rubber mill and were sheeted off into thin sheets.

| | A | B | C | D |
|---|---|---|---|---|
| Natural Rubber Smoked Sheets | 100 | 100 | 100 | 50 |
| GR–S | | | | 50 |
| Whiting | 60 | 20 | | |
| MT Carbon Black | | 40 | 20 | 20 |
| HMF Carbon Black | | | 40 | 40 |
| Zinc Oxide | 5 | 5 | 5 | 5 |
| Circo Oil (Light process oil) | 30 | 30 | 50 | 50 |
| Benzo thiazyldisulfide | 1.0 | 1.0 | 1.0 | |
| Santocure (n-cyclohexyl-2-benzo-thiazole sulfonamide) | | | | 1.5 |
| Thionex (tetramethyl thiuram monosulfide) | 0.2 | 0.2 | 0.2 | |
| Sulfur | 3 | 3 | 3 | 2.5 |
| Stearic Acid | 15 | 10 | 5 | |
| Sodium Bicarbonate | 15 | 10 | 5 | |
| Diazo-amino-benzene | | | | 1 |
| Biuret | 1 | 3 | 10 | 2.5 |

Each of the foregoing batches produced a satisfactory cure when slabs of the product were molded and cured in a hydraulic press with heat being applied through steam platens for 15 minutes at a temperature of 324 degrees F.

Batch A shows the use of a small amount of biuret to aid the action of sodium bicarbonate in producing a medium grade sponge of moderate expansion. The quantity of biuret in this batch was about 6% by weight of the total gas producing composition and represents the minimum quantity of biuret which may be employed for the purpose of the present invention where the biuret is used in conjunction with other gas producing agents.

Batch B shows the use of biuret and sodium bicarbonate together in cases where it is desired to use not more than 10 parts of sodium bicarbonate per hundred parts of rubber.

Batch C shows the use of a relatively large amount of biuret and a small amount of sodium bicarbonate. This composition is useful where it is desired to obtain good reinforcement and good resilience in the sponge. Because of the large amount of carbon black it might be desired to obtain the major amount of blow with biuret and to use the sodium bicarbonate to obtain the characteristic cell structure of that material.

Batch D illustrates the use of biuret and diazoamino-benzene together. Since the latter causes serious staining when used in amounts over 1.0 part per hundred parts by weight of polymer, there are many products where an additional blowing agent, such as biuret which is compatible with the diazo-amino-benzene, is very desirable in order to obtain sufficient expansion without staining.

It will be apparent that the quantity of the gas producing composition may vary in the practice of the present invention between 3.5 parts and 16 parts per hundred parts by weight of polymer. If the biuret is used alone as the gas producing composition, it is preferable to employ it in quantities within the range of 5 parts to 15 parts per hundred parts by weight of polymer. In some instances, where the biuret is used alone as the gas producing agent, it may be used in quantities as low as 4 parts per hundred parts by weight of polymer. Where it is employed in conjunction with other gas producing agents, more particularly sodium bicarbonate, ammonium bicarbonate, and/or diazo-amino-benzene, the quantity of biuret may be reduced while still obtaining superior results with the combination of ingredients, but in any case, the quantity of biuret should be at least 6% by weight of the gas producing composition. For example, where the biuret is employed in conjunction with sodium bicarbonate or ammonium bicarbonate the weight ratio of the biuret to the bicarbonate may vary within the range of 1:16 to 2:1 (see Example IV). Where the biuret is employed in conjunction with diazo-amino-benzene it is preferable to use less than one part of the diazo-amino-benzene and at least 2.5 parts of the biuret per hundred parts by weight of polymer (see Example IV).

The invention is generally applicable to the preparation of soft and/or hard cellular products from materials which may be characterized as millable polymers that are plastic at temperatures within the range of 266 degrees F. to 350 degrees F. Such materials include natural rubber and reclaimed natural and synthetic rubber. Natural and synthetic rubbers may be described generically as sulfur vulcanizable rubbery polymers containing the butadiene 1,3 nucleus. Among the polymers class as synthetic rubbers to which the invention is applicable are Buna N (a copolymer of butadiene and acrylonitrile); Buna S (a copolymer of butadiene and styrene); neoprene (a polymer of 2-chloro-1,3-butadiene); butyl rubber (a copolymer made from a high percentage of isobutylene and a minor percentage of isoprene) and Thiokol (the name given to a number of products prepared by the interaction of sodium tetrasulfide and certain dichloro compounds in which each of the chlorine atoms occupies an end position, such as the reaction between ethylene dichloride and sodium tetrasulfide which gives Thiokol A or the reaction between dichloroethyl ether and sodium tetrasulfide which gives Thiokol B). Additionally, the invention is applicable to other elastic polymers usually called plastics, e. g. vinyl polymers, such as polyvinyl chloride, polyvinyl acetate, polyvinylidene chloride, and copolymers, including Geon (a polyvinyl chloride polymer sold by B. F. Goodrich Chemical Company to other manufacturers who then process it into finished products); Koroseal (a trade name designating a polyvinyl chloride polymer sold as a finished product by B. F. Goodrich Co.); Vinylite (a copolymer of vinyl chloride and vinyl acetate made by Carbide and Carbon Chemicals Co.); and Saran (a polymer of vinylidene chloride and vinyl chloride, or a copolymer of vinylidene chloride and acrylonitrile made by Dow Chemical Company).

This invention is especially desirable for compounding cellular products from synthetic rubbers. The compounding of natural rubber cellular products presents little difficulty compared with the problems encountered in making similar products from GR-S or other synthetics. Natural rubber is relatively easy to plasticize sufficiently so that any one of several gas producing agents has the ability to expand the rubber and hold it expanded until the cure is completed. Since even highly plasticized natural rubber has fairly good tensile strength, reinforcing fillers need not be used.

Most synthetics, on the other hand, are difficult to plasticize and reinforcing fillers must be used to obtain sufficient tensile strength for most purposes. Since reinforcing fillers generally cause a decrease in plasticity, it is necessary to balance the three factors of plasticity, reinforcement, and blowing power to produce satisfactory cellular products. With a relatively weak blowing agent, such as sodium bicarbonate, it is possible to obtain a well blown product with little strength by using a highly plasticized but poorly reinforced stock, or a poorly blown but high strength sponge by using a reinforced stock which is not sufficiently plastic. Efforts to balance the two extremes often lead to products unsatisfactory in all respects.

In order to obtain good results, it is desirable to use a gas producing agent with sufficient blowing power so that the moderate reinforcing fillers can be incorporated into partially plasticized stock. The gas producing agent provided in accordance with this invention fulfils these requirements and produces a sponge with high tensile strength and consequently good resilience.

Another advantage of the gas producing agent of this invention over blowing agents such as sodium bicarbonate is that relatively small cells of uniform size are produced.

A further advantage of biuret over agents such as bicarbonate is the fact that it is not necessary to compress the finished article and break the cell walls. As a result the article has better resilience or ability to come back to normal when depressed.

In compounding stock for the production of cellular products with a gas producing agent as provided herein, it is not necessary to use other agents, such as fatty acids, since biuret decomposes directly into ammonia without any interaction with other materials. The only fatty acid necessary, namely, that required for accelerator activation, is usually present in sufficient quantity in the crude synthetic rubber.

It will be understood that this invention is not limited to the use of either the anhydrous or the hydrated form of biuret, but applies to the use of biuret which may be anhydrous or contain water of hydration.

An important feature of the compositions provided in accordance with this invention is their stability at temperatures up to about 120 degrees C. (250 degrees F.) and their ability to generate gas between the temperatures of 130 degrees C. and 177 degrees C. (266 degrees F. and 350 degrees F.), or at higher temperatures. The temperature preferably should be below the temperature at which substantial charring occurs. A preferred curing range is from about 287 degrees F. (142 degrees C.) to about 340 degrees F. (171 degrees C.).

An important feature of the use of the biuret in accordance with this invention is its stability against decomposition at the temperatures at which the ingredients are mixed and its ability to generate gas at higher temperatures below those at which scorching or charring of the products occur.

Other advantages are its relatively low cost, the ease of incorporating it into a solid rubber mix on the rubber mill, its ability to generate relatively large quantities of gas per unit weight of the chemical used, its ability to generate gas in medium sized cells or pockets (that is, neither too large nor too small), the fact that it generates a gas that does not easily diffuse through the rubber, and the fact that it generates a gas which remains in the gaseous state when the rubber product is cooled down to room temperature. Further advantages result from the fact that it decomposes into chemicals which are not harmful to the rubber product, to workers in the rubber factory, or to fabrics or other materials which come in contact with the finished product or with users of the product.

The invention is hereby claimed as follows:

1. A method of producing cellular products which comprises incorporating into a millable polymer which is plastic at temperatures within the range of 266 degrees F. to 350 degrees F. a heat decomposable, gas producing composition containing biuret in sufficient quantities to act as a blowing agent to form cellular products substantially free from collapsing of the cells therein, and heating the resultant material to temperatures at which the biuret decomposes to produce ammonia and expand said material, and setting the resultant expanded cellular material.

2. A method of producing cellular products which comprises incorporating into a millable polymer which is plastic at temperatures within the range of 266 degrees F. to 350 degrees F. 3.5 to 16 parts per hundred parts by weight of said polymer of a heat decomposable, gas producing composition, of which at least 6% is biuret, heating the resultant material to temperatures at which the biuret decomposes to produce ammonia and expand said material, and setting said expanded material, said quantity of said gas producing composition being sufficient to gas expand said polymer when heated therewith in said temperature range to form cellular products substantially free from collapsing of its cells.

3. A method of producing cellular products which comprises intimately mixing into a millable polymer which is plastic at temperatures within the range of 266 degrees F. to 350 degrees F. 5 to 15 parts per hundred parts by weight of said polymer of biuret, at temperatures below 250 degrees F., then raising the temperature of the resultant mixture to a temperature within the range of 266 degrees F. to 350 degrees F. to expand said material, and setting said expanded material.

4. A method of producing cellular products which comprises incorporating into a millable polymer which is plastic at temperatures within the range of 266 degrees F. to 350 degrees F. 3.5 to 16 parts per hundred parts by weight of said polymer of a heat decomposable, gas producing composition, of which at least 6% is biuret and the remainder is a substance from the group consisting of alkali metal and ammonium bicarbonates and diazo-amino-benzene, heating the resultant material to temperatures at which the biuret decomposes to produce ammonia and expand said material, and setting said expanded material, the quantity of said gas producing composition being sufficient to gas expand said polymer to form cellular products substantially free from collapsing of the cells therein.

5. A method of producing cellular products which comprises intimately mixing into a millable polymer which is plastic at temperatures within the range of 266 degrees F. to 350 degrees F. 13 to 16 parts per hundred parts by weight of said polymer of a gas producing composition consisting essentially of biuret and sodium bicarbonate in a weight ratio within the range of 1:15 to 2:1, at temperatures below 250 degrees F., and heating the resultant material to temperatures at which the biuret and the sodium bicarbonate are decomposed to form a gas to expand said material, and setting the expanded material, the quantity of said gas producing composition being sufficient to gas expand said polymer to form cellular products substantially free from collapsing of the cells therein.

6. A method of producing cellular products which comprises intimately mixing into a millable polymer which is plastic at temperatures within the range of 266 degrees F. to 350 degrees F. a gas producing composition comprising essentially diazo-amino-benzene and biuret, the quantity of diazo-amino-benzene being sufficient for gas expansion of said polymer in said temperature range and not more than 1 part by weight per hundred parts of polymer and the quantity of the biuret being at least 2.5 parts but not exceeding 15 parts by weight per hundred parts of polymer at temperatures below 250 degrees F., heating the resultant material to temperatures at which the diazo-amino-benzene and the biuret decompose to produce gases and expand said material, and setting said expanded material, the quantity of said gas producing composition being sufficient to gas expand said polymer to form cellular products substantially free from collapsing of the cells therein.

7. A method of producing cellular rubber products which comprises incorporating into a sulfur vulcanizable rubbery polymer of a compound containing the butadiene 1,3 nucleus, 3.5 to 16 parts per hundred parts by weight of said polymer of a heat decomposable gas producing composition, of which at least 6% is biuret and the remainder of said blowing agent is a substance from the group consisting of alkali metal and ammonium bicarbonates and diazo-amino-benzene, the quantity of said gas producing composition being sufficient to gas expand said polymer to form cellular products substantially free from collapsing of the cells therein, and heating the resultant rubber mixture at temperatures sufficiently high to decompose said gas producing composition to form ammonia.

8. A method of producing cellular rubber products which comprises incorporating into a sulfur vulcanizable rubbery polymer of a compound containing the butadiene 1,3 nucleus, 3.5 to 16 parts per hundred parts by weight of said polymer of a heat decomposable gas producing composition, of which at least 6% is biuret and the remainder of said blowing agent is a substance from the group consisting of alkali metal and ammonium bicarbonates and diazo-amino-benzene, the quantity of said gas producing composition being sufficient to gas expand said polymer to form cellular products substantially free from collapsing of the cells therein, heating the resultant rubber mixture at temperatures sufficiently high to decompose said gas producing composition to form ammonia thereby forming bubbles of gas within the rubber mixture and expanding it, and vulcanizing the rubber mixture while it is in said expanded state.

9. A method of producing cellular products which comprises incorporating into a sulfur vulcanizable synthetic rubbery mixture containing a butadiene-styrene synthetic rubber, 3.5 to 16 parts per hundred parts by weight of said synthetic rubber of a heat decomposable gas producing composition, of which at least 6% of said composition is biuret and the remainder of said blowing agent is a substance from the group consisting of alkali metal and ammonium bicarbonates and diazo-amino-benzene, the quantity of said gas producing composition being sufficient to gas expand said polymer to form cellular products substantially free from collapsing of the cells therein, heating the resultant mixture at temperatures sufficiently high to decompose said gas producing composition to form a gas and thereby to expand the synthetic rubber mixture by forming bubbles of gas therein, and vulcanizing the synthetic rubber mixture while it is in said expanded state.

10. A method of producing cellular rubber products which comprises essentially incorporating into a sulfur vulcanizable rubbery polymer of a compound containing the butadiene 1,3 nucleus, at temperatures below 250 degrees F. 5 to 15 parts per hundred parts by weight of said polymer of biuret, and then raising the temperature of said mixture to a temperature within the range of 266 degrees F. to 350 degrees F.

11. An essentially anhydrous composition of matter capable of yielding a gas expanded cellular material upon heating, said composition comprising a millable polymer plastic at temperatures within the range of 266 degrees F. to 350 degrees F. intimately mixed with a heat decomposable gas producing composition containing biuret in a sufficient quantity to act as a blowing agent when said composition is heated in said temperature range, said composition of matter, when heated in said temperature range and set, forming cellular products substantially free from collapsing of the cells therein.

12. An essentially anhydrous composition of matter capable of yielding a gas expanded cellular material upon heating, said composition comprising a millable polymer plastic at temperatures within the range of 266 degrees F. to 350 degrees F. intimately mixed with 3.5 to 16 parts per hundred parts by weight of said polymer of a heat decomposable gas producing composition, of which at least 6% of said gas producing composition is biuret and the remainder is a substance from the group consisting of alkali metal and ammonium bicarbonates and diazo-amino-benzene, the quantity of said gas producing composition being sufficient to gas expand said polymer when heated in said temperature range to form cellular products substantially free from collapsing of the cells therein.

13. An essentially anhydrous composition of matter yielding a gas expanded material upon heating, said composition comprising a millable polymer plastic at temperatures within the range of 266 degrees F. to 350 degrees F. intimately mixed with a heat decomposable gas producing composition comprising essentially 5 to 15 parts per hundred parts by weight of said polymer of biuret.

14. An essentially anhydrous composition of matter yielding a gas expanded cellular material upon heating, said composition comprising a millable plymer plastic at temperatures within the range of 266 degrees F. to 350 degrees F. intimately mixed with 13 to 16 parts per hundred parts by weight of said polymer of a heat decomposable gas producing composition consisting essentially of biuret and sodium bicarbonate, the weight ratio of biuret to sodium bicarbonate being within the range of 1:16 to 2:1.

15. An essentially anhydrous composition of matter yielding a gas expanded cellular material upon heating, said composition comprising a millable polymer plasic at temperatures within the range of 266 degrees F. to 350 degrees F. intimately mixed with a heat decomposable gas producing composition consisting essentially of one part per hundred parts by weight of said polymer of diazo-amino-benzene and 2.5 parts per hundred parts by weight of said polymer of biuret.

GRADY M. O'NEAL.

References Cited in the file of this patent

UNITED STATES PATENTS

| Number | Name | Date |
|---|---|---|
| 1,418,825 | Naylor | June 6, 1922 |
| 1,503,429 | Russell | July 29, 1924 |
| 2,195,623 | Harman | Apr. 20, 1940 |
| 2,250,192 | Cuthbertson | July 22, 1941 |
| 2,282,026 | Bren | May 5, 1942 |
| 2,371,868 | Berg et al. | Mar. 20, 1945 |

OTHER REFERENCES

Schwartz: India Rubber World, May 1946, pages 211, 212 and 219, vol. 114.